US007966686B2

(12) United States Patent
Turner (10) Patent No.: US 7,966,686 B2
(45) Date of Patent: Jun. 28, 2011

(54) SUPPORT STRUCTURE FOR CAR WASH COMPONENTS

(75) Inventor: Barry S. Turner, Novi, MI (US)

(73) Assignee: Belanger, Inc., Northville, MI (US)

( * ) Notice: Subject to any disclaimer, the term of this patent is extended or adjusted under 35 U.S.C. 154(b) by 1297 days.

(21) Appl. No.: 11/371,483

(22) Filed: Mar. 9, 2006

(65) Prior Publication Data

US 2007/0209129 A1  Sep. 13, 2007

(51) Int. Cl.
*B60S 3/04* (2006.01)
(52) U.S. Cl. ........ 15/53.1; 15/DIG. 2; 52/844; 52/653.2
(58) Field of Classification Search .......... 15/53.1–53.3, 15/DIG. 2; 52/843, 844, 650.1, 651.07, 653.2, 52/220.2, 220.7, 222, 301; D25/28, 32, 35
See application file for complete search history.

(56) References Cited

U.S. PATENT DOCUMENTS

| | | | | |
|---|---|---|---|---|
| 3,371,454 A | * | 3/1968 | Anderson | 52/126.4 |
| 3,624,852 A | * | 12/1971 | Hanna | 15/53.3 |
| 4,163,537 A | * | 8/1979 | Mourgue | 248/188.1 |
| 5,690,239 A | * | 11/1997 | Ballard | 211/189 |
| 5,864,998 A | * | 2/1999 | Loomer | 52/271 |
| 5,915,803 A | * | 6/1999 | Daugherty et al. | 312/263 |
| 6,202,279 B1 | | 3/2001 | Belanger et al. | 29/428 |
| 6,372,053 B1 | | 4/2002 | Belanger et al. | 134/34 |
| 6,668,495 B1 | * | 12/2003 | Prince | 52/63 |

* cited by examiner

*Primary Examiner* — Laura C Guidotti
(74) *Attorney, Agent, or Firm* — Young Basile Hanlon & MacFarlane PC (57) ABSTRACT

A single column or multiple column support structure for car wash installations. Each column is a hollow aluminum extrusion having a cross-section defining a smooth rounded figure such as an oval and a pair of longitudinally continuous external channels formed in opposite sides of the column to provide routes for wires and hoses. Snap in plastic covers are associated with the channels. Interior channels received fastener inserts for assembling the columns to base plates, top plates, cross-bridges and the like. Two or more columns may be assembled in parallel spaced relationship with spacers therebetween.

9 Claims, 7 Drawing Sheets

SUPPORT STRUCTURE FOR CAR WASH COMPONENTS

FIELD OF THE INVENTION

This invention relates to car wash installations and more particularly to an improved beam-like support structure for use in connection with the mounting of car wash components such as rotatable brushes, spray bars and air blowers.

BACKGROUND OF THE INVENTION

A typical car wash installation includes a number of treatment stations typically constructed with vertical beams mounted on floor plates. To form an arch, two or more such support structures are mounted on opposite sides of a wash lane. A bridge structure is mounted between the two vertical support structures and car wash components such as rotatable brushes or air blowers may be mounted thereon. The brushes may either be top brushes with essentially horizontal axes of rotation or side brushes with essentially vertical axes of rotation. Other components such as spray bars, nozzles, mitter curtains and air blowers may also be mounted to such structures with or without horizontal cross bridges.

Many car wash installations are at least partially fabricated on site. This may require cutting beams to length as well as securing structures to one and other by welding and/or bolting operations. Hollow aluminum and lighter gauge steel beams are preferred in such situations because they are light, easy to transport and handle, and easier to cut to the desired length than, for example, steel I-beams. In the past, square or rectangular section beams have been used. While effective, structures built with square or rectangular beams exhibit relatively little aesthetic appeal. In addition, wires and hoses are usually attached to the external surfaces of such beams.

SUMMARY OF THE INVENTION

In accordance with the broadest aspect of the present invention, a novel support element for car wash installations is provided. The support element comprises a column member having the rigid structural characteristics and strength of a beam, but also having a cross-section which defines a smooth, rounded figure such as an oval or ellipse. The column further has at least a first longitudinally continuous external channel formed in one side of the column to provide a routing for hoses, electrical wires and small diameter pipes. Finally, the column comprises a snap in cover which can be attached to the column to close the side channel.

In the preferred form the cross-section of the column is an oval or ellipse, those terms being used interchangeably in this specification to define a rounded figure with two different diameters. The term "ellipse" is not necessarily limited to a figure satisfying the mathematical definition of an ellipse. Also in the preferred form, two external channels are provided, one in each of the longer sides, and snap in covers are provided for closing the channels. The channels have opposed ribs near the opening to coact with resilient fingers formed on the snap in cover to provide a locking function which also allows the covers to be removed. The covers are preferably extruded of a resilient material such as plastic. The beam structures may be extruded from aluminum.

As hereinafter described, the column of the present invention may be used in singles or in multiples, may be mitered and joined to form L-shapes and the like and may be mounted vertically, horizontally or at an angle, when used as a vertical, a column is typically attached by bolts to a base plate. The attachment is facilitated by a number of partially open channels which are formed in the hollow interior of the column. These open channels receive threaded fastener inserts which are threaded into the ends of the channel to receive bolts which secure the base plates to the columns. A similar arrangement may be used to secure a top plate, cross bridge or other structure to an end of the column.

According to a second aspect of the invention, columns are used in pairs and are arranged in parallel, spaced apart relationship and secured to a base plate in the manner described above. A gusset is preferably used to provide additional stability and the gusset is preferably bolted to a spacer extending between the columns as well as welded to the base plate. Additional spacers may be used at spaced intervals along the length of the two column support structure. A variety of car wash support structures may be constructed using the invention including those having overhead cross bridges to support components such as those described above.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENT

Figure 1:
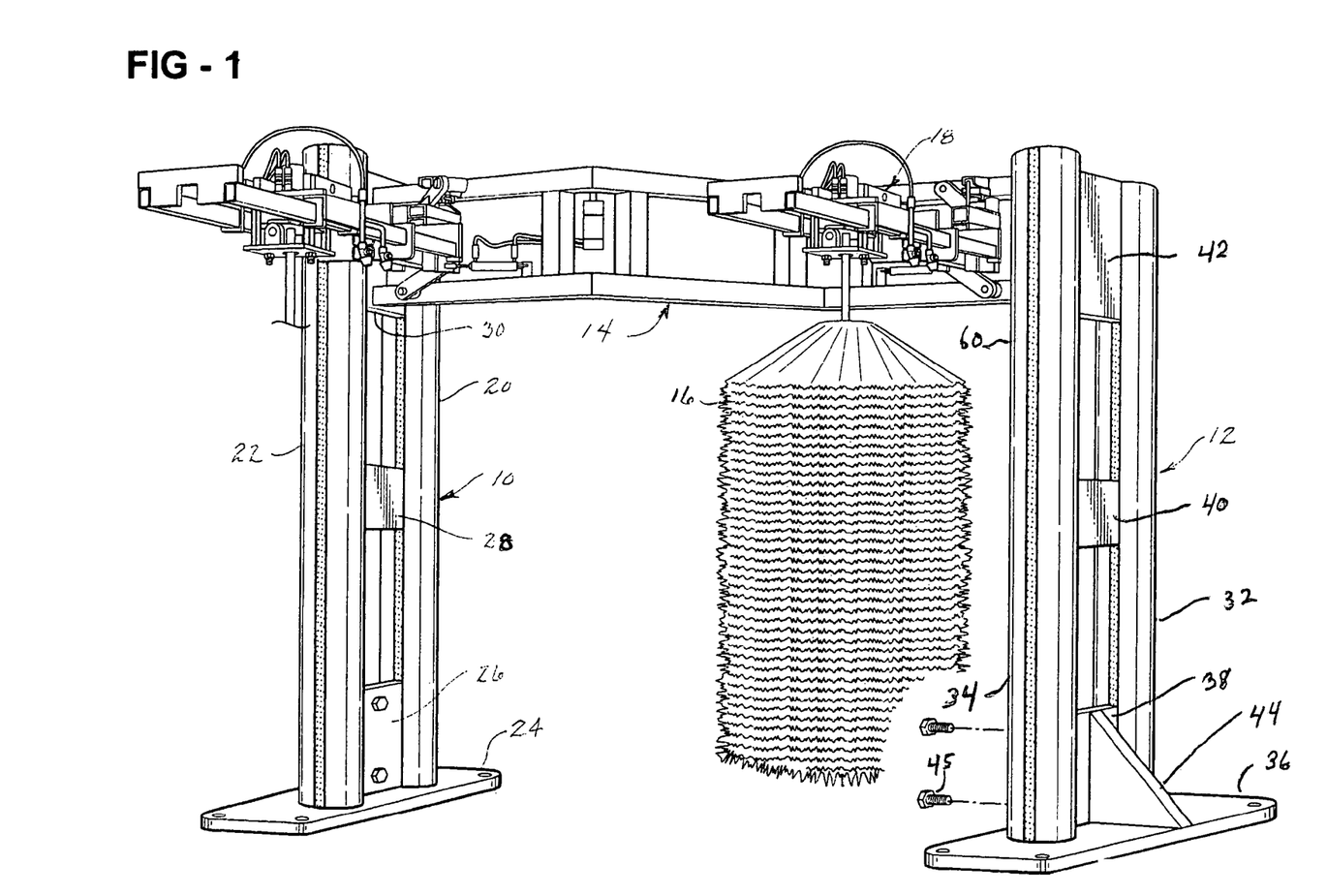
FIG. 1 is a perspective view of a car wash station using two brush support structures constructed in accordance with the invention.
Figure 2:
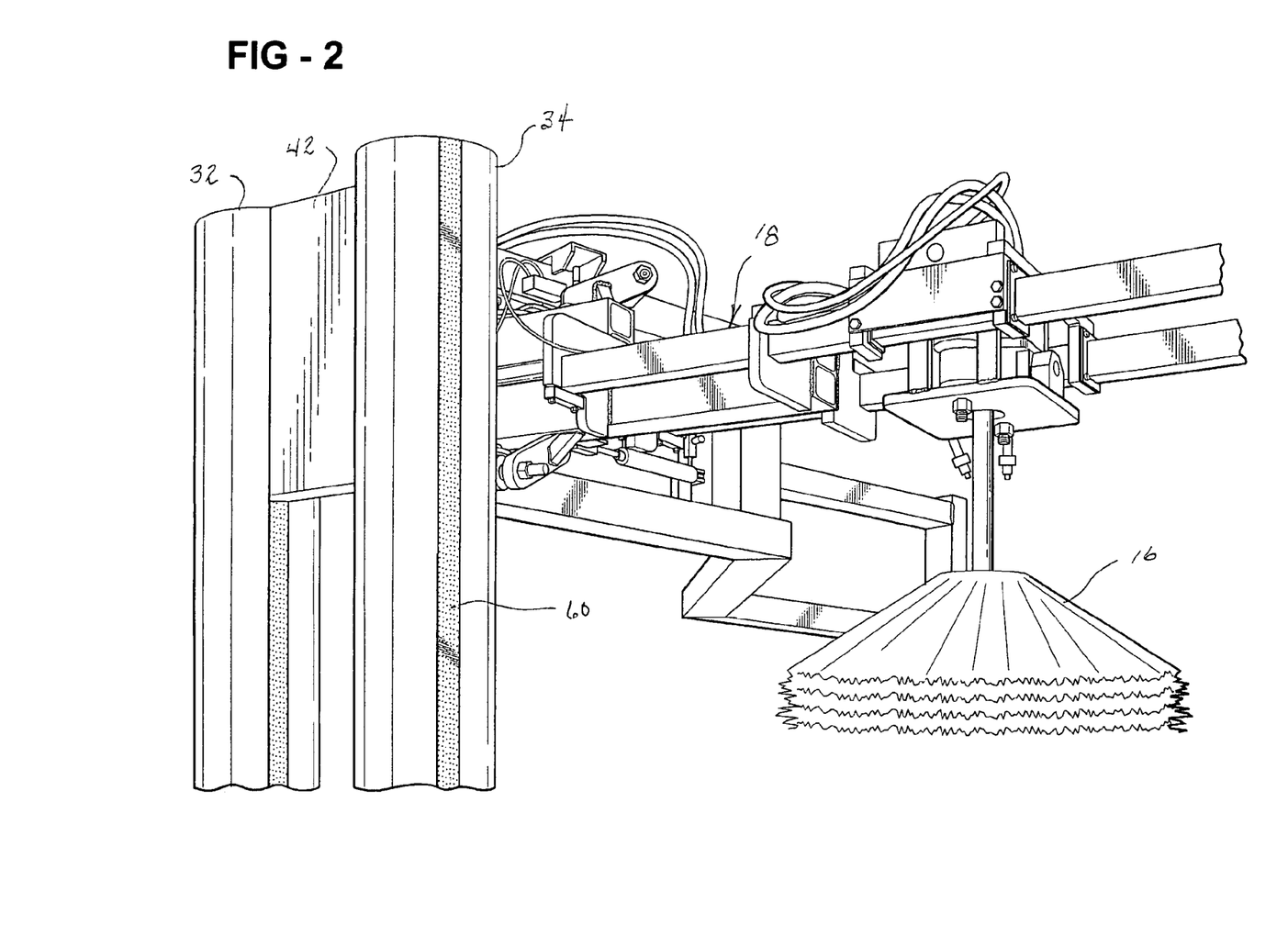
FIG. 2 is a close up view of a portion of the station of FIG. 1.

Referring first to FIGS. 1 and 2, there is shown a portion of a car wash installation comprising a pair of vertical support structures 10 and 12 disposed on opposite sides of a wash lane and being structurally joined by an overhead bridge structure 14 which carries one or more vertically depending rotatable brushes 16. Vertically depending brushes are shown in FIGS. 1 and 2 by way of example only, it being understood that a variety of other car wash components such as spray arms, nozzles, mitter curtains and air blowers may also be supported by the structures 10 and 12 with or without the overhead bridge structure 14.

Brush 16 is mounted to the support structure 10, 12, 14 by means of a control system 18 which is more fully described in the co-pending application Ser. No. 11/096,574; filed Apr. 1, 2005, and assigned to Belanger, Inc. Again that system is cited by way of example only.

Support structure 10 comprises vertical columns 20 and 22 mounted to an aluminum base plate 24. A spacer 26 separates the columns 20 and 22. By way of example, the columns 20 and 22 are made of extruded aluminum and each has a cross-section defining a smooth rounded figure, in this case an oval measuring approximately 7" in the larger diameter and about 4½" in the smaller diameter. The base plate measures approximately 16×24". Additional spacers 28 and 30 are mounted between the columns 20 and 22 to increase rigidity.

Similarly, support structure 12 is made up of parallel spaced apart columns 32 and 34 which are identical to the columns 20 and 22 and are mounted to an aluminum base plate 36 in a manner hereinafter described. A spacer 38 of aluminum plate stock is mounted between the columns 32 and 34 near the base plate 36. Additional spacers 40 and 42 are provided between the columns 32 and 34 as shown. A gusset 44 is bolted to the spacer 38 by bolts 45 and is welded to the base plate 36. A similar gusset is used in structure 10 but is not visible in FIG. 1.

Figure 3:
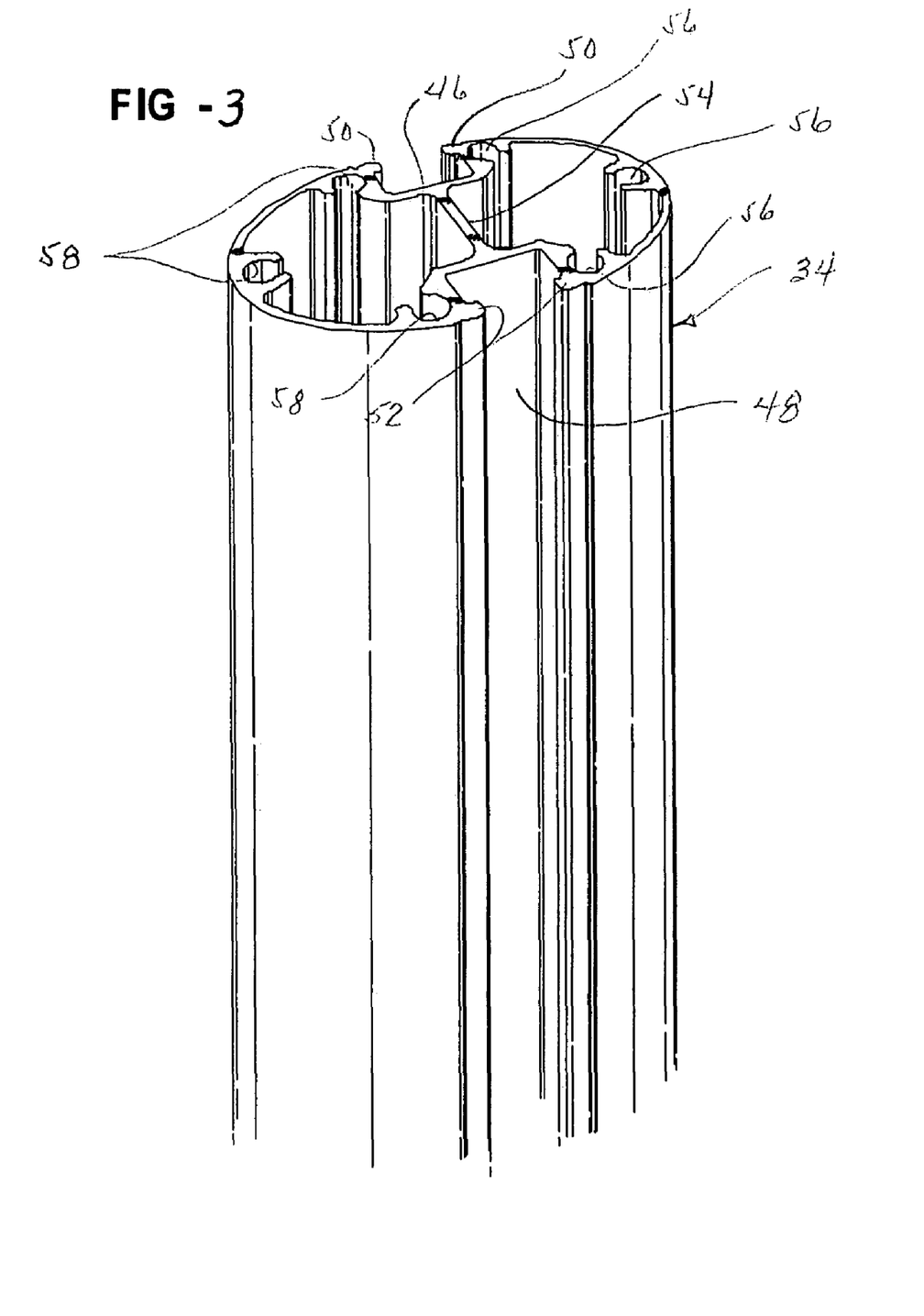
FIG. 3 is a perspective view of a single column constructed in accordance with the invention.
Figure 4:
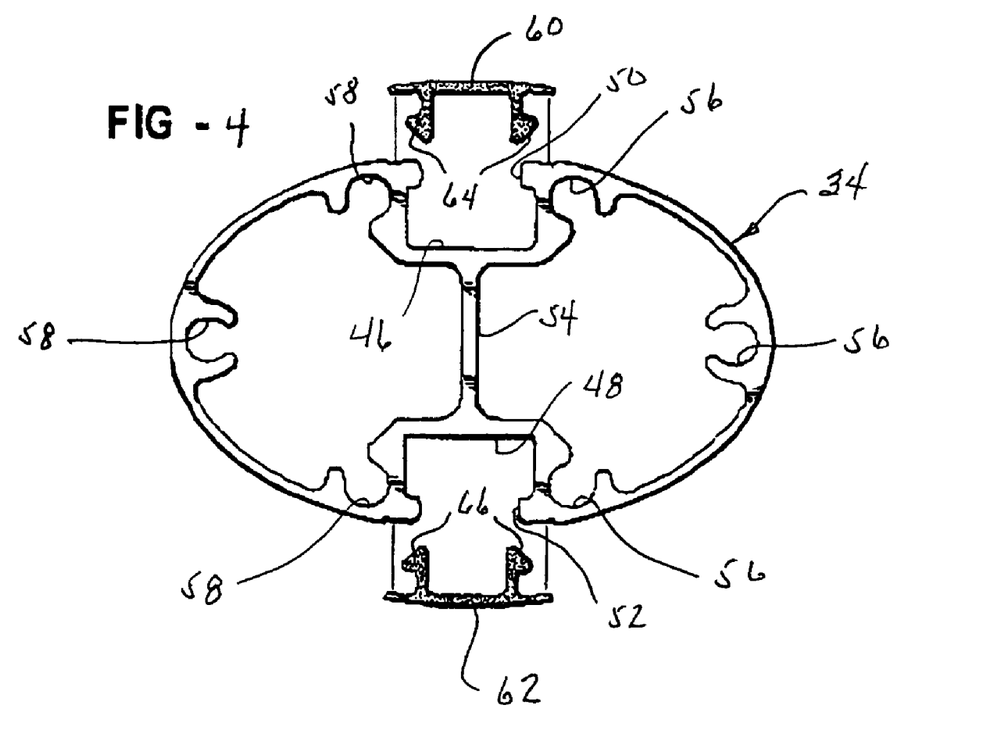
FIG. 4 is an end view of the column of FIG. 3 showing how extruded plastic side channel covers are snapped into place.

Turning now to FIGS. 3-7, the details of the representative column 34 and the manner in which it is integrated into the structure 12 will be described. As shown in FIGS. 3 and 4, the column 34 is a hollow, oval shaped aluminum extrusion with a center rib 54. The opposite longer side surfaces are interrupted by continuous, longitudinal channels 46 and 48 which are essentially rectangular in section and have interior walls which are integrally joined by the cross-web 54. Ribs 50 narrow the opening to the channel 46 to receive a snap-in plastic cover as hereinafter described. Similarly, ribs 52 narrow the opening of the channel 48. Partially open interior channels 56 are formed within the right side hollow chamber of the column 44 to receive commercially available fastener inserts 70 as hereinafter described with reference to FIGS. 5 and 6. Similar partially open interior channels 58 are formed in the opposite left side chamber for the same purpose. Since the column 34 is preferably manufactured by extruding aluminum, the cost of the die which forms the column is substantially reduced by leaving the channels 56 and 58 partially open. However, it is to be understood that fully closed channels may also be produced at a higher die cost.

As shown in FIG. 4 plastic covers 60 and 62 are provided for the purpose of closing the channels 46 and 48 respectively and providing an aesthetically pleasing, essentially flush exterior surface to the column 34. The covers 60 and 62 may be of a color which either contrasts or blends with that of the extruded aluminum. Cover 60 has inwardly projecting, parallel spring fingers 64 which coact with the ribs 50 to provide a snap in feature. Similarly, cover 62 is provided with resilient parallel fingers 66 which coact with the ribs 52 to provide a snap in feature. Hoses, wires and pipes are routed through the channels and concealed by the snap-in covers. A screw driver or other prying tool may be used to non-destructively remove the covers 60 and 62 from the column 34 in the event service is required. While plastic is described as the preferred material of construction for the covers 60 and 62, they may of course be made of other materials including aluminum and/or other metals which either contrast with or blend with the exterior appearance of the column 34.

It is also to be understood that all four of the columns 20, 22, 32 and 34 are constructed in the manner shown in FIGS. 3 and 4.

Figure 5:
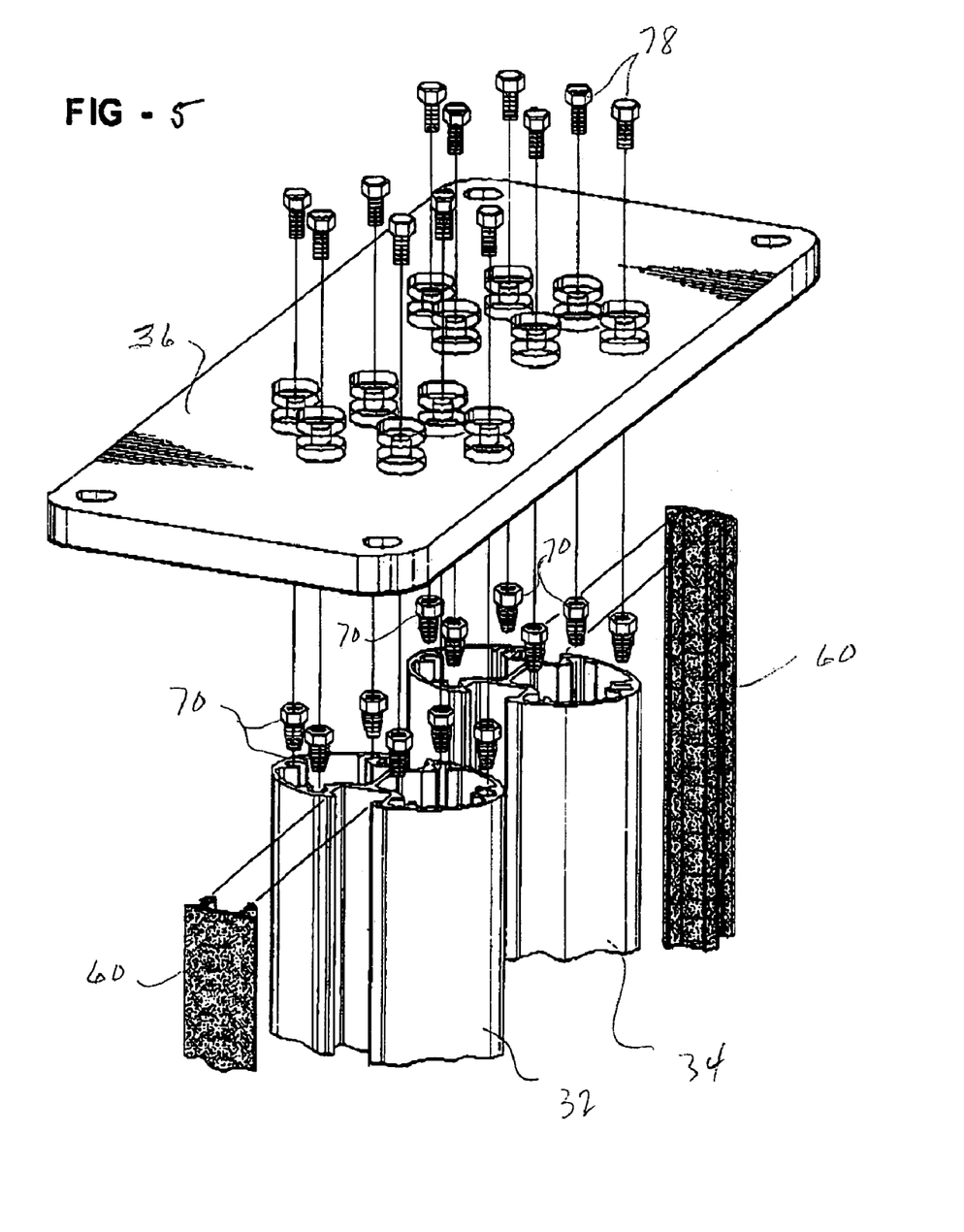
FIG. 5 is a perspective exploded view showing how two identical support columns are joined by bolts to a base plate.
Figure 6:
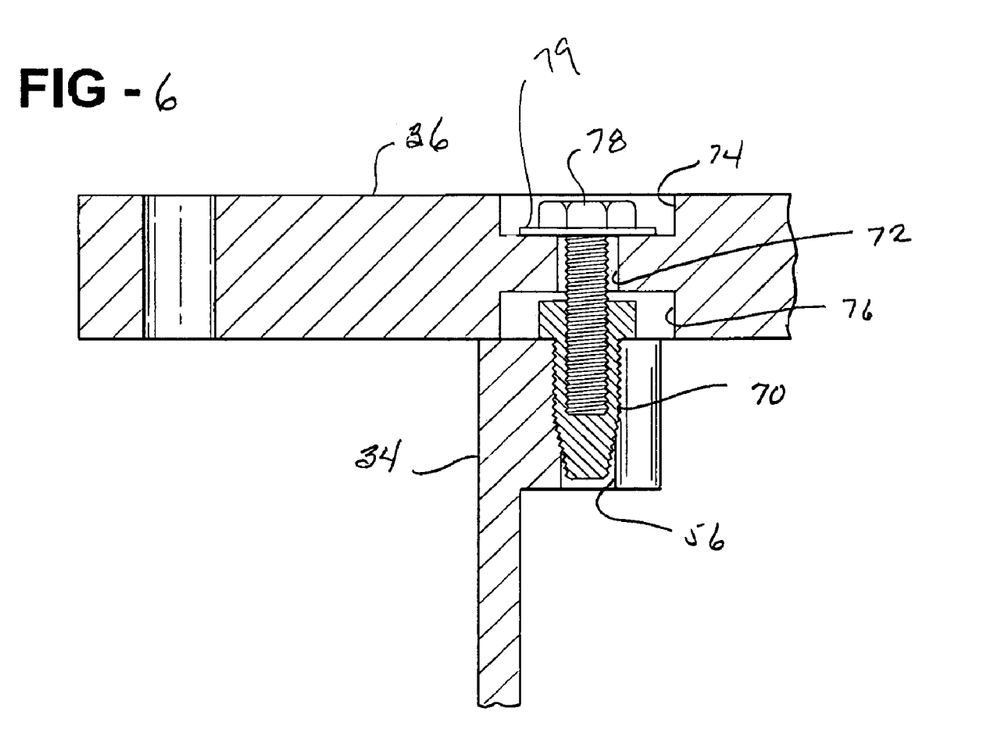
FIG. 6 is a cross-sectional detail of the bolt structure in the apparatus of FIG. 5.

Turning now to FIGS. 5 and 6 an illustrative technique for attaching the base plate 36 to a pair of columns 32 and 34 will be described. First the "Helicoil" fastener inserts 70 are threaded into tapped holes in the ends of the channels 56 and 58 in both columns 32 and 34. As shown in FIG. 6, the base plate 36 is provided with a plurality of strategically placed holes 72 so as to line up with the channels and the threaded fastener inserts 70. The holes are counter-sunk at 74 and 76 to provide room for the head of a bolt 78 as well as the head of the fastener insert 70. The bolt 78, along with a washer 79 as required, extends through the base plate and into the fastener insert 70 for securing the plate 36 to the column 34 as shown. The same technique may be used to secure a top plate or a cross-structure to the top ends of the columns 20, 22, 32 and 34 in the structure of FIGS. 1 and 2.

Figure 7:
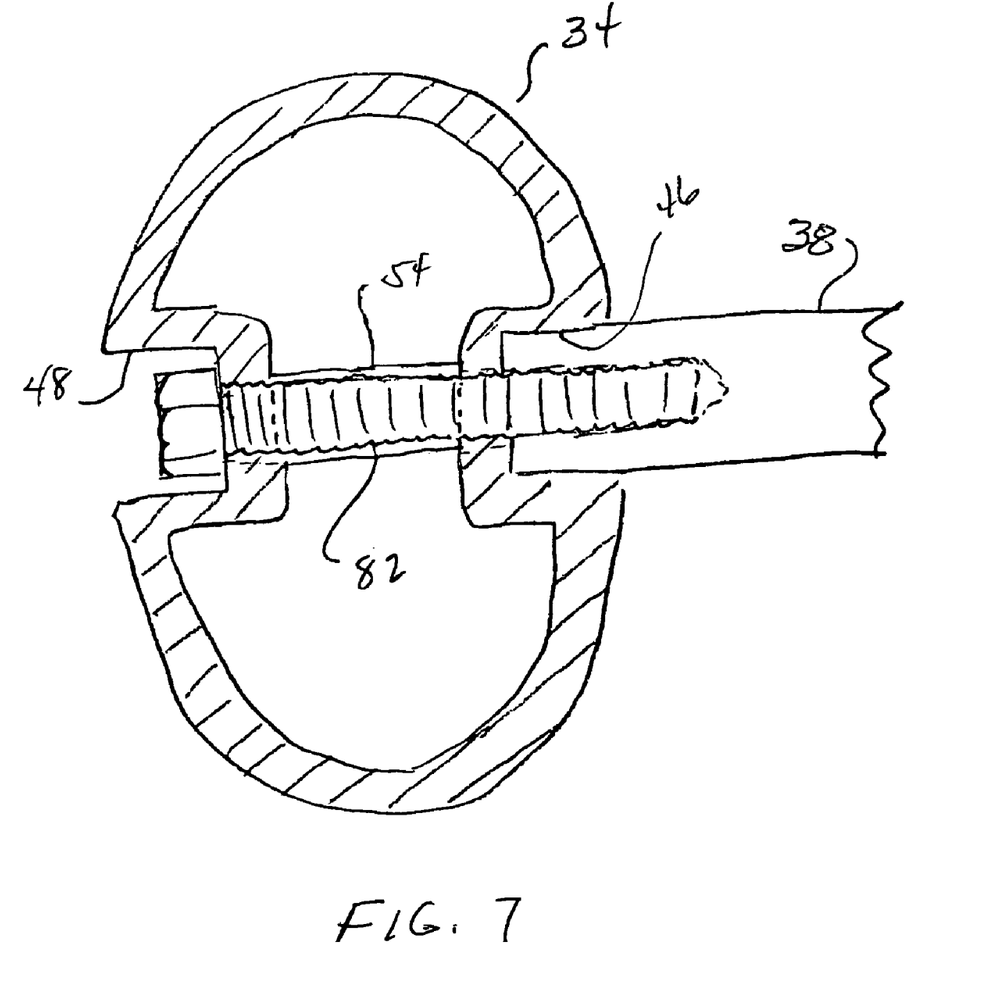
FIG. 7 is a cut away view partly in section showing how a spacer is joined to one of the columns in the structure of FIG. 5.

Looking now to FIG. 7, the manner in which the spacer plate 38 is secured to the column 34 is illustrated. The spacer 38 is of the proper thickness to fit into the channel 46 and against the bottom surface thereof adjacent the web 54. A hole 80 is milled through the web 54 to accommodate a bolt 82 which extends through the beam and into a tapped hole in the edge of the spacer plate 38. It will be understood that this illustration is by way of example only and other techniques including welding may be employed to secure the spacers to the columns.

By way of summary, it is clear from the foregoing description that the columns may be used in multiples as well as in single column installations. In the event that the single column using a base plate, a gusset is preferably fit into one of the side channels and either bolted or welded into place essentially as described above. Extruded plastic channel covers are used to cover the external channels on both the outside and inside surfaces of the pillars or columns and are cut to length to as to fit between the spacers where spacers are used. As describe above, hoses, pipes, wires, and other long flexible objects may be routed through the channels so as to maintain the pleasing aesthetic appearance of a car wash installation using the invention in either single or multiple column forms.

The dimensions given above are by way of example only as the columns may be made in larger or smaller sizes as desired.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A structural column for supporting car wash equipment comprising:
   a generally hollow, extruded metal structure of substantially elliptical cross-section defining an exterior wall having longer sides and shorter sides forming a smoothly curved surface;
   a pair of opposed, inwardly-extending recesses formed in said longer sides;
   a structural rib integral with and extending between said recesses to divide the interior of said structure into two reversely similar fully enclosed, semi-elliptical chambers;
   a set of elongate covers which fit over said recesses; and
   at least one piece of car wash equipment supported by said column.

2. The structural column defined in claim 1 wherein opposed inwardly-directed lips are formed on each of said recesses, the covers having complemental detents with said lips so as to snap-fit into and over said recesses.

3. The structural column defined in claim 1 including a base plate and threaded fastener means for attaching said base plate to an end of said column.

4. A structural support for car wash equipment comprising:
   a pair of side-by-side rigid structural columns, each of which is a generally hollow extruded metal structure of substantially elliptical cross-section defining an exterior wall having opposed longer sides and opposed shorter sides integral with the shorter sides;

each of said columns further comprising a pair of opposed, inwardly-extending recesses formed in said longer wall sides and a structural rib integral with and extending between said recesses to divide the interior of each structure into two reversely similar, fully enclosed, semi-elliptical chambers;

elongate covers which fit over said recesses to conceal the interiors thereof; and at least one piece of car wash equipment supported by said columns.

5. A structural support as defined in claim 4 further comprising at least one rigid spacer plate extending between said pair of columns and fitting into the adjacent recesses thereof.

6. A structure as defined in claim 4 further comprising a base plate and threaded fastener means for attaching said columns to said base plate.

7. A structure as defined in claim 4 wherein said recesses have opposed lips formed along the edges thereof, said covers having detents which snap-fit into said recess lips.

8. A support structure for car wash equipment comprising:
a base;
a pair of hollow metal columns having generally oval shaped exterior surfaces disposed in side-by-side, spaced-apart, parallel relationship and commonly secured to said base;
each of said columns having formed in the exterior surfaces thereof a longitudinally extending recessed channel in each of said columns being oriented so as to face another channel in the other of said columns;
a spacer plate mounted to and between said columns so as to extend into said channels;
means for mechanically interconnecting said columns to said spacer plate;
each of said columns having insert-receiving holes formed into end surfaces thereof to receive threaded inserts; and
a plurality of threaded fasteners securing said base to each of the columns via said threaded inserts.

9. A support structure as defined in claim 8 further comprising a gusset mechanically attached to said base and at least one of said columns and extending into a channel in said one column.

* * * * *